Figure 1:
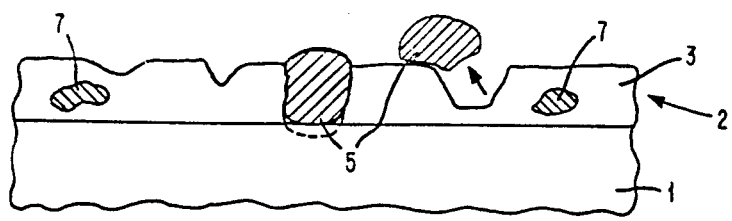

United States Patent [19]

Bandara et al.

[11] Patent Number: 4,710,424
[45] Date of Patent: Dec. 1, 1987

[54] MAGNETIC DISK AND METHOD OF MAKING SAME

[75] Inventors: Upali Bandara, Stuttgart; Holger Hinkel; Werner Steiner, both of Boeblingen; Gerhard Trippel, Sindelfingen, all of Fed. Rep. of Germany

[73] Assignee: International Business Machines Corporation, Armonk, N.Y.

[21] Appl. No.: 790,710

[22] Filed: Oct. 24, 1985

[30] Foreign Application Priority Data

Oct. 31, 1984 [EP] European Pat. Off. ........ 84113054.5

[51] Int. Cl.⁴ .............................................. G11B 5/708
[52] U.S. Cl. ................................ 428/325; 252/62.54;
427/128; 427/131; 428/328; 428/329; 428/336;
428/404; 428/405; 428/407; 428/331; 428/694;
428/900; 428/422
[58] Field of Search ............... 428/694, 695, 422, 421,
428/407, 425.9, 405, 329, 328, 331, 900, 336,
325, 323, 404; 427/131, 132, 128; 252/62.54

[56] References Cited

U.S. PATENT DOCUMENTS

| | | | |
|---|---|---|---|
| 3,476,595 | 11/1969 | Nacci | 428/422 |
| 4,074,002 | 2/1978 | Hack | 428/694 |
| 4,076,890 | 2/1978 | Yamada | 428/694 |
| 4,120,995 | 10/1978 | Phipps | 427/314 |
| 4,268,556 | 5/1981 | Pedrotty | 428/65 |
| 4,334,887 | 6/1982 | Frank | 428/694 |
| 4,526,836 | 7/1985 | Mukai | 428/422 |
| 4,529,659 | 7/1985 | Hoshino | 428/422 |
| 4,578,314 | 3/1986 | Ohta | 428/694 |
| 4,581,296 | 4/1986 | Balz | 428/900 |
| 4,583,145 | 4/1986 | Mönnich | 428/422 |
| 4,584,243 | 8/1986 | Kadokura | 428/900 |
| 4,590,127 | 5/1986 | Hashimoto | 428/405 |
| 4,634,627 | 1/1987 | Fujiki | 428/694 |

*Primary Examiner*—Ellis P. Robinson
*Attorney, Agent, or Firm*—Joseph G. Walsh

[57] ABSTRACT

The magnetic disk contains on a disk substrate a magnetic layer comprising a binder, magnetic particles and abrasion-resistant particles, the abrasion-resistant particles being enveloped with a layer intensifying the bond between binder and abrasion-resistant particles. The enveloping layer either has a large specific surface and consists e.g. of $SiO_2/Al_2O_3$ produced by processing the particles with an alkali metal silicate solution and an aluminum sulphate solution, or it is chemically bonded to the binder by enveloping the particles with poly(tetrafluroethylene) and coupling the latter, via an amino bridge to the binder, e.g. an epoxide resin.

The magnetic disk according to the invention minimizes the abrasion of the magnetic layer as well as the damaging of the magnetic layer and of the magnetic head by knocked-out abrasion-resistant particles.

3 Claims, 3 Drawing Figures

U.S. Patent   Dec. 1, 1987   Sheet 1 of 1   4,710,424

MAGNETIC DISK AND METHOD OF MAKING SAME

The invention relates to a magnetic disk having a magnetic layer applied on a substrate and comprising a binder, e.g. a resin, magnetic particles and an abrasion-resistant material, and to a method of making such a magnetic disk, where on a substrate a dispersion consisting of a binder, magnetic particles and abrasion-resistant particles is uniformly applied and subsequently cured. The term binder refers to the matrix containing the abrasion-resistant and magnetic particles in the finished magnetic layer, as well as to the material which is converted into this matrix only in the course of the production of the magnetic layer.

High capacity magnetic disks used at present comprise substrates, preferably of aluminum, aluminum-magnesium or silicon, and a magnetic layer that is deposited thereon and preferably of a 1 μm thickness, comprising a magnetic particle-filled resin. To make sure that the magnetic disk is able to resist the effect of the hard magnetic head of ceramic material which drags over the disk in the start/stop phase, the resin is additionally filled with aluminum oxide particles amounting to approximately 2 Vol. % of the layer. Actually, the magnetic head does not drag on the resin directly but on the aluminum oxide particles serving as a support. Such magnetic disks are made by spinning onto the substrate a dispersion comprising the magnetic and the abrasion-resistant particles, the binder and a solvent, and subsequently curing it and by polishing the surface of the magnetic layer thus obtained. In principle, such a deposit would satisfy all requirements provided the adhesion of the aluminum oxide particles in the resin matrix is very high. However, this does not apply; in fact, in the operation of the disk frequently a knocking-out of aluminum oxide particles is observed, with the consequence that the disk is subjected to increased abrasion in all those places where aluminum oxide particles are knocked out, and that the hard aluminum oxide particles lying on the disk surface contribute to a wear of the disk surface and of the magnetic head, and that finally this leads to a premature failure of the system consisting of magnetic disk and magnetic head. This problem is encountered as early as in functional tests after the termination of disk production, or when the disk is used at the customer's place; up to now it has therefore caused serious interruptions of production, and high maintenance costs.

It is therefore the object of the invention to provide a magnetic disk which has a magnetic layer comprising a binder, magnetic particles and an abrasion-resistant material, and which is deposited on a substrate, and where the abrasion-resistant material remains firmly anchored even in those cases where the magnetic head drags over tne disk; and to provide a method with which such a magnetic disk can be made reproducibly, maintaining close tolerances in factory-like production. This object is achieved by the present invention.

The enveloping layer firmly adheres to the abrasion-resistant particles, and owing to its structure or its chemical properties it is able to establish a very strong bond with the binder. The main characteristics of the abrasion-resistant particles, that is, their shape and abrasion resistance do not change decisively in the process.

The magnetic disk according to the invention differs from the known magnetic disks only in that the abrasion-resistant particles are coated. The remaining components of the magnetic disk, i.e. the substrate, the binder which preferably consists of an epoxide resin, and the magnetic particles remain unaltered. For that reason, the magnetic disk according to the invention satisfies the magnetic specifications set for the known magnetic disk. In the course of the present text, two advantageous kinds of envelope intensifying the bond between the binder and the abrasion-resistant particles will be described. The intensification is of a different effect, and the costs for the envelope differ accordingly; in other words, depending on the demands made to the magnetic disks the respective envelope can be provided.

The method as disclosed by the invention differs from known methods only in that the known sequence of process steps is preceded by the process of enveloping the abrasion-resistant particles. The introduction of the method as disclosed by the invention does not require a modification of the formerly used method, nor does it need extensive investigations as to whether the method as disclosed by the invention is compatible with the formerly used process. The process of enveloping is a not-obvious combination of known and uncritical process steps being common in preparative chemistry.

The abrasion-resistant particles in the magnetic layer as disclosed by the invention have advantageously a diameter which is much smaller than the thickness of the magnetic layer. Preferably, the diameters of the abrasion-resistant particles are smaller by a factor of 2 to 10 than the thickness of the magnetic layer. As it has been found that the anchoring of the abrasion-resistant particles improves with their size, the particles in the known magnetic disks usually have a diameter whose size equals the thickness of the magnetic layer. However, big abrasion-resistant particles in the magnetic layer can cause magnetic defects, e.g. owing to read signal losses and a high basic noise level. Similarly, big abrasion-resistant particles have a tendency of protruding from the surface of the magnetic layer. These protruding particles are increasingly exposed to the risk of being knocked out, and even if they are not knocked out they represent a danger for the magnetic head which they might soil and damage. Furthermore, an irregular magnetic layer surface can cause problems with the flight height of the magnetic head. The cause of the protrusion of the particles from the magnetic layer surface is elastic relaxation. This means that if the particles used in the production of the magnetic disk are bigger than the thickness of the polished magnetic layer they are pushed into the substrate under the influence of the polishing disk, and as soon as they are made free of that pressure they are pushed upward perpendicularly to the substrate surface so that they protrude from the polished surface. This problem is depicted in FIG. 1. Similarly, the other above-mentioned problems with big abrasion-resistant particles in magnetic disks are due to difficulties caused by such particles in the production of the magnetic disks.

In the production of the magnetic layer from the magnetic resist containing binder and magnetic and abrasion-resistant particles, the magnetic particles have a tendency to form accumulations at the abrasion-resistant particles, this tendency increasing with their size. This disturbs the orientation of the magnetic particles. During the spinning-on of the dispersion there also appear triangle defects, provided big particles are involved. These defects are triangular defects in the magnetic layer, where one respective corner of the triangle comprises an abrasion-resistant particle which obviously affects the flux of the magnetic resist.

In the magnetic disks as disclosed by the invention the abrasion-resistant particles can be smaller than in the known magnetic disks, because in the magnetic disks according to the invention the improved anchoring is achieved by another means. However, when small abrasion-resistant particles are used all above specified disadvantages and difficulties encountered in connection with big particles are avoided.

The enveloping layer advantageously comprises $SiO_2/Al_2O_3$. The given layer has a specific surface which is approximately 10 times bigger than the specific surface of e.g. aluminum oxide particles, and approximately 5 times bigger than in those cases where the enveloping layer consists of $SiO_2$ only. The reason for the increased specific surface is not known. The increased surface considerably improves the adhesion of the abrasion-resistant particles, and it also improves the wetability with the lubricant. As the contact takes place mainly between the magnetic head and the aluminum oxide particles, the improved wetability reduces the frictional force precisely at the decisive spots. Again, this considerably reduces the risk of abrasion-resistant particles being knocked out upon contact with the magnetic head. The $SiO_2/Al_2O_3$ layer adheres excellently to particles of hard ceramic material, preferably aluminum oxide, silicon carbide or silicon nitride.

The abrasion-resistant particles are advantageously enveloped by the $SiO_2/Al_2O_3$ layer in that the particles are suspended in water and heated to approximately 90° C., with a pH value of approximately 10 being set by adding sodium hydroxide, in that subsequently a sodium silicate solution is admixed and then the pH value is reduced to approximately 9, in that this mixture is dispersed for approximately one hour and subsequently an aluminum sulphate solution is admixed and the pH value reduced to approximately 8, and in that finally there follows another dispersion for one hour at 93°–97° C. Thus the envelope is produced by means of a non-obvious combination of uncritical, reproducible process steps which are conventional in preparative inorganic chemistry. The big surface of the enveloped, abrasion-resistant particles thus obtained has also a positive effect on the method as disclosed by the invention for making magnetic disks; the increased surface causes improved dispersion characteristrcs, and an improved stability of the dispersion in the production of the magnetic layer. The consequence is a more uniform distribution of the aluminum oxide particles in the magnetic layer, and thus the prevention of agglomerates which are the reason for negative magnetic and mechanical effects.

In another preferred embodiment of the magnetic disk as disclosed by the invention, the abrasion-resistant particles consist of a hard oxide with OH groups at the particle surface, as e.g. aluminum oxide, and they are enveloped in a poly(tetrafluroethylene) (PTFE) layer between approximately 10 and approximately 50 nm thick. The PTFE is preferably chemically bonded to the oxide via a siloxane bridge and if necessary via an initiator residue, and via an amino-bridge to the binder preferably consisting of epoxide resin. If the oxide particles are chemically bonded to the binder their anchoring is of optimum quality, i.e. this embodiment specifically presents all advantages of a firm anchoring of the oxide particles, including the advantages resulting from the possibility of making the oxide particles smaller than usual. However, enveloping the oxide particles with PTFE offers the further advantage that the exposed part of the oxide particles in the magnetic layer surface is partially coated with PTFE, and that especially on the magnetic layer surface the spaces between the binder and the oxide are filled with PTFE. This considerably improves the sliding of the magnetic head on the magnetic disk; on the one hand, wetting with the lubricant and replacing it by afterflow after it was stripped off is considerably improved compared with an oxide surface, and on the other hand the PTFE ensures satisfactory emergency characteristics even upon exhaustion of the lubricant.

This embodiment of the magnetic disk according to the invention with PTFE-enveloped oxide particles is preferably made in that the alkoxy groups of a siloxane which also contains terminal reactive groups is made to react with OH groups on the surface of the abrasion-resistant oxide particles, in that the reaction product is copolymerized with tetrafluoroethylene, using an initiator, in that in a plasma containing alkylamine gas alkylamine residues are grafted to the PTFE chain, and in that the thus modified PTFE enveloping the oxide particles, after the deposition on the substrate of the dispersion consisting of the binder and the magnetic and abrasion-resistant particles is coupled, during the conventional cross-linking reaction of the epoxide binder, via $NH_2$-groups to the epoxy resin network. This embodiment of the method as disclosed by the invention is remarkable, on the one hand, in view of the excellent characteristics of the magnetic disk thus made. On the other hand, this result is achieved by a not obvious selection of materials, and by a not obvious combination of process steps which are conventional in organic chemistry and therefore uncritical, easily controlled and thus highly reproducible. Indeed, the embodiment of the magnetic disk in accordance with the invention with PTFE-coated, abrasion-resistant particles is more complex than the embodiment where the abrasion-resistant particles are enveloped with the $SiO_2Al_2O_3$ layer, but in the former embodiment the anchoring of the particles in the binder is still better that in the latter.

For further advantageous embodiments of the magnetic disk according to the invention, and of the method as disclosed by the invention reference is made to the subclaims.

In the following, the invention will be described with respect to embodiments depicted in drawings.

Figure 2:
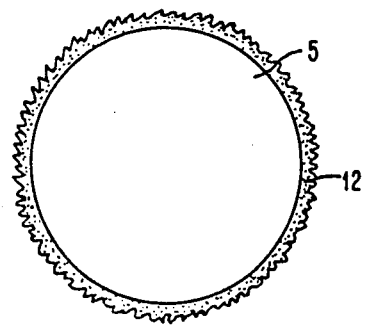
Figure 3:
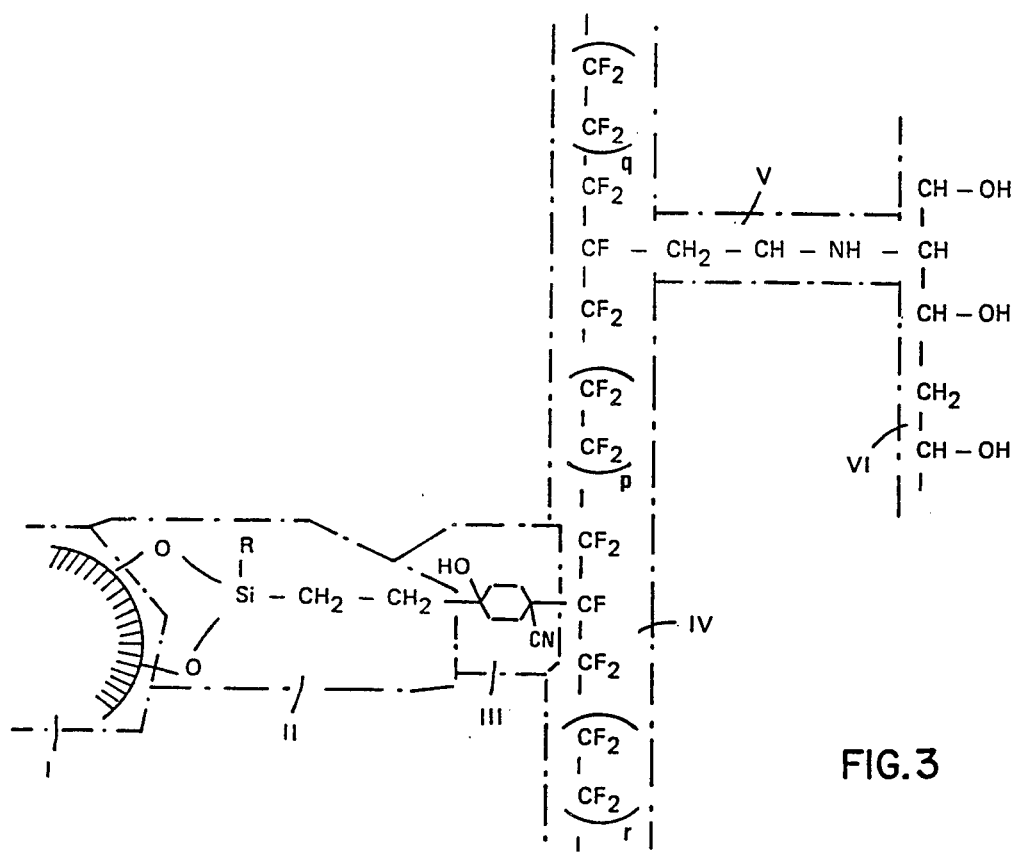

The drawings show the following:

FIG. 1 in a schematic cross-section part of a magnetic disk in accordance with prior art, depicting elastic relaxation and the problems encountered upon the knocking-out of an abrasion-resistant particle;

FIG. 2 in a schematic cross-section an abrasion-resistant particle enveloped in a surface layer, said particle being used in an embodiment of the magnetic disk as disclosed by the invention; and FIG. 3 in a schematic structural formula representation the chemical linkage characteristic for an embodiment of the magnetic disk as disclosed by the invention, of a poly(tetrafluoroethylene) layer enveloping an oxide particle with the oxide on the one hand and with the epoxide resin used as a binder on the other.

FIG. 1 shows in a cross-section part of a magnetic disk in accordance with prior art. On substrate 1 which is a disk and consists of aluminum, an aluminum alloy as e.g. aluminum magnesium or aluminum silicon, or silicon, magnetic layer 2 is applied which consists of binder 3, abrasion-resistant particles 5 preferably consisting of aluminum oxide, and magnetic particles 7 preferably consisting of $Fe_2O_3$. Abrasion-resistant particles 5 are approximately of spherical form, and the size of their diameter approximately equals the thickness of magnetic layer 2. The figure also represents the problem of elastic relaxation. If magnetic layer 2 is polished after the curing of binder 3, abrasion-resistant particles 5 which, if bigger prior to polishing than the thickness of magnetic layer 2 after polishing being practically in contact with substrate 1 therebeneath, are pushed into substrate 1 by the pressure of the polishing disk. After polishing, i.e. when the pressure of the polishing disk decreases, substrate 1 pushes abrasion-resistant particle 5 upward, eliminating the impression caused during polishing, so that particles 5 protrude from the polished surface of magnetic layer 2. The magnetic head which slides over the magnetic disk in operation, and which is in contact therewith in the start/stop phase collides with the protruding abrasion-resistant particles and is thus damaged, and/or knocks the particles out of their anchoring in the binder. The consequence of this knocking-out is twofold: (1) in the spot where the abrasion-resistant particles had been removed there appears a surface area on the magnetic layer which is increasingly exposed to abrasion, and (2) abrasion-resistant particles 5 which, as shown in FIG. 1, lie on the magnetic disk surface cause defects of the magnetic head on the one hand and of the magnetic disk on the other.

The magnetic disk according to the invention differs from the known magnetic disks in that the abrasion-resistant particles are coated with an envelope which is between 1 and 100 nm thick and increases the anchoring of the abrasion-resistant particles in the binder, and in that the diameter of the abrasion-resistant particles is preferably smaller—particularly by a factor of 2 to 10—than the thickness of the magnetic layer. For the rest, the magnetic disk according to the invention is of the same structure as the known magnetic disk, i.e. it has a magnetic layer which is deposited on a disk substrate and comprises a cured mixture of the magnetic and the abrasion-resistant particles. It furthermore has the same dimensions as the known magnetic disks. The binder preferably comprises a material such as epoxide resins, polyurethanes, phenol resins, polyester resins and melamine resins. The magnetic particles consist mostly of $Fe_2O_3$, and the abrasion-resistant particles preferably of ceramic materials, with a Mohs hardness $\geq 9$, as e.g. hard oxides and in particular $Al_2O_3$, silicon carbide, silicon nitride and titanium carbide. The thickness of the magnetic layer is between 0.1 and 1 $\mu$m. The magnetic layer according to the invention comes up to the magnetic specifications which are binding for known magnetic disks. The features in which the magnetic disk according to the invention differs from the known version effects an increased reliability and wear resistance.

The method as disclosed by the invention differs from known methods in the processing of the abrasion-resistant particles, i.e. their coating with a layer before being dispersed in the binder, together with the magnetic particles.

The enveloping layer can consist e.g. of $SiO_2/Al_2O_3$. Surprisingly, a thus composed layer has a specific surface increased approximately 10 times compared with abrasion-resistant aluminum oxide particles. The increase of the specific surface was detected by means of the low temperature nitrogen adsorption method in accordance with BET (Brunauer, Emmett and Teller). The increase of the surface considerably improved the anchoring of the abrasion-resistant particles in the binder. The abrasion resistance of the enveloped abrasion-resistant particles is still determined by the abrasion resistance of the particle material, so that owing to their being enveloped with the $SiO_2/Al_2O_3$ layer the wear of the magnetic layer by the magnetic head is considerably reduced. The increased specific surface also improves the wetability with the lubricant in those places where the abrasion-resistant particles are exposed on the surface of the magnetic layer. Thus, the frictional force is considerably reduced in precisely those spots where there is the main contact between the magnetic disk and the magnetic head. There is furthermore a reduced risk of individual particles being knocked out of the magnetic layer owing to friction caused by the magnetic head. Tne particle diameters are preferably smaller by a factor of 2 to 10 than the thicknesses of the magnetic layer. This reduces the read signal loss to such an extent that the number of magnetic defects is much reduced. Similarly, the magnetic basic noise level is improved owing to the reduction of the abrasion-resistant particles. The positive influence on these parameters is particularly high if a magnetic layer consisting of a double layer is provided where the abrasion-resistant particles are dispersed only in the upper layer, i.e. all abrasion-resistant particles are near the surface and reduce the wear there.

The $SiO_2/Al_2O_3$ layer is preferably made in that the abrasion-resistant particles are dispersed in water and subsequently treated, with predetermined temperatures and pH values in the basic range being observed, first with a silicate solution and subsequently with an aluminum salt solution. $SiO_2/Al_2O_3$ layers on aluminum oxide particles with a very high adhesion and a specific surface increased approximately 10 times against aluminum oxide particles, are made e.g. according to the following process: 45 g $Al_2O_3$ particles of the grain size selected are heated to approximately 90° C. with 300 ml distilled water, and stirred with approximately 2000 RPM. The pH value is fixed at 10.0 by the dropwise admixture of an NaOH solution. After the admixture of 20 ml of a 40% sodium silicate solution the pH value is reduced very quickly to 9.0 by the dropwise admixture of hydrochloric acid. Stirring is continued for one hour, with the temperature of 90° C. being maintained, and deviations from the pH value of 9.0±0.1 being corrected by adding NaOH or HCl, respectively. After the reaction period 20 ml of a 50% aluminum sulphate solution are admixed very quickly, and the pH value is immediately reduced to 8.0 by adding hydrochloric acid. After an additional reaction period of 60 minutes, with stirring being continued and a reaction temperature in the range of 93° and 97° C. being maintained the process is terminated. The thus enveloped aluminum oxide particles are filtered, thoroughly rinsed with distilled water, dried at 150° C., and finally pulverized.

The enveloped particles are used as mentioned above in the production of magnetic disks, i.e. they are dispersed in a solvent or solvent mixture together with the binder, e.g. an epoxide resin, the magnetic particles, e.g. consisting of $\gamma$-$Fe_2O_3$ and, if necessary, additions like a wetting agent. Such dispersions are produced in an agitator, in ball mills or pearl mills, respectively. Tne dispersion preferably consists, in percent by weight, of 60% solvent mixture (mixture of xylene, ethylamylketone and isophoron), and approximately 40% of a solid substant mixture (approximately 50% binder, approximately 49% $Fe_2O_3$ and approximately 1% $Al_2O_3$). The finished dispersion is used to coat the magnetic disk substrate, and subsequently the desired layer thickness is fixed by means of spinning-off. There follows the curing of the magnetic layer, and subsequently the magnetic layer surface is polished and finally coated with a lubricant film, if necessary after a cleaning step. This is followed by tests to ensure that the thus made magnetic disk is of a very high abrasion resistance, and that there is practically no knocking-out of abrasion-resistant particles during operation.

For making a magnetic disk with a double layer as magnetic layer, with abrasion-resistant particles being enveloped in the upper layer only two dispersions are made which differ in that only one contains enveloped and abrasion-resistant particles. First, the substrate with the dispersion not containing any abrasion-resistant material is coated, and subsequently the necessary layer thickness is achieved by spinning-off. On this first layer, a second layer of a predetermined thickness is produced in the same manner out of the dispersion containing abrasion-resistant material. There follow the above-specified process steps, starting with curing.

If the abrasion-resistant particles consist of a hard oxide which on its surface comprises OH groups—Al$_2$O$_3$ satisfies this demand—the enveloping layer advantageously consists of PTFE which is chemically bonded to the hard oxide and also to the matrix consisting e.g. of a resin. The PTFE is advantageously bonded to the hard oxide via a siloxane bridge and, if necessary, to an initiator residue, and to the resin matrix via an amino bridge. FIG. 3 schematically represents in a structural formula representation such a chemical bonding of a PTFE envelope to an abrasion-resistant particle on the one hand and to the resin matrix on the other. In FIG. 3, reference I in the cross-section represents a sector of an abrasion-resistant particle. The abrasion-resistant particle is bonded to the PTFE chain IV via the siloxane residue II and the initiator residue III. With the epoxide resin VI serving as a binder the PTFE chain IV is bonded via an amino bridge V. The PTFE-coated, abrasion-resistant particles are of approximately spherical shape, and their diameter is preferably smaller by a factor of 2 to 10 than the thickness of the finished magnetic layer (0.1 to 1 μm). Apart from epoxide resins, such binders can be used for which there exist coupling reagents which contain groups that can react with tetrafluoroethylene, as well as groups that can react with the binder. If amines are used as coupling reagents these conditions are satisfied not only by epoxide resins but also by e.g. polyurethanes and melamine resins.

The PTFE-coated, abrasion-resistant particles have turned out to be strongly anchored in the resin matrix, and the sliding characteristics of the magnetic disk if contacted with the magnetic head are excellent.

For making the structure of FIG. 3, the abrasion-resistant particles consisting of a hard oxide with OH groups on the surface are made to react with the siloxane, in accordance with reaction (1).

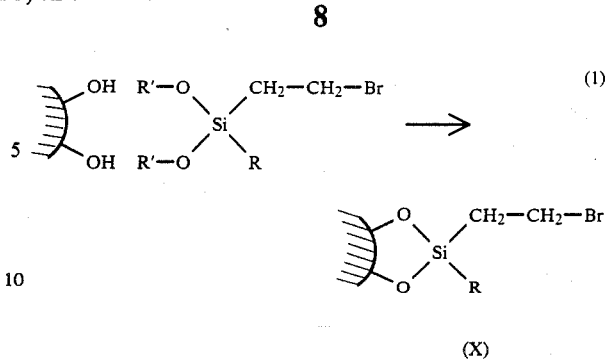

As siloxanes, triethoxybromomethylsilane or trimethoxybromomethylsilane can e.g. be used. The reaction presents the reaction product (X). With a Grignard reaction, the reaction product (X) is converted into the reaction product (XI) in accordance with reaction (2).

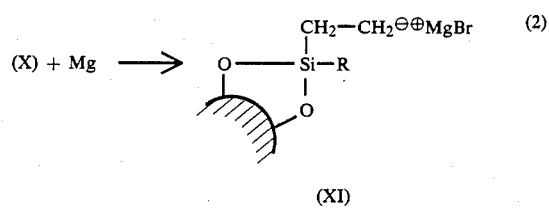

The reaction product (XI) is converted with an initiator, e.g. 1,1-azobis-cyclohexanecarbonitrile into the reaction product (XII) in accordance with the reaction (3).

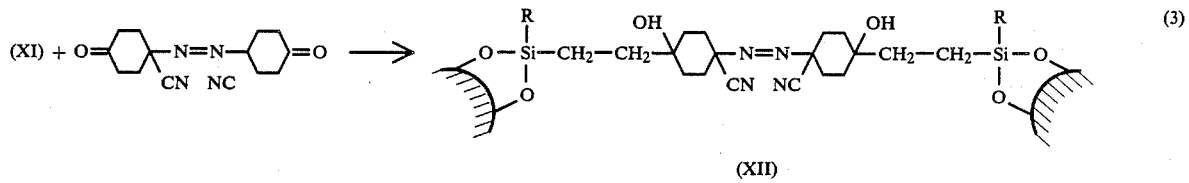

The reaction product (XII) is copolymerized with tetrafluoroethylene into the reaction product (XIII) in accordance with the reaction (4).

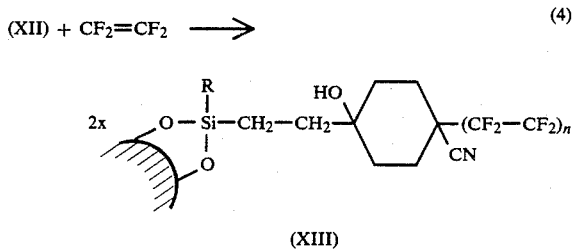

In a plasma, the —CF$_2$—CF$_2$—CF$_2$ group contained in the reaction product (XIII) is made to react with an amine, as e.g. butyl amine or amyl amine, previously activated in the plasma (see reaction (5)), with the reaction product (XIV) being formed in accordance with the reaction (6).

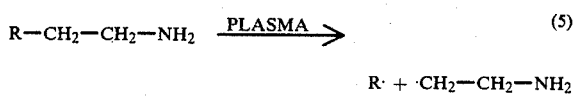

-continued

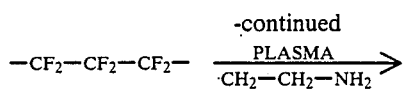  (6)

$$-CF_2-CF-CF_2-CF_2 + F$$
$$\quad\quad |$$
$$\quad\quad CH_2-CH_2-NH_2$$

(XIV)

The reaction forms the reaction product (XIV). (The formula of the reaction product given in reaction (6) merely represents the part of (XIV) relevant for the reaction, i.e. a section of the PTFE chain and a side chain with an amino group). The reaction product (XIV), i.e. the enveloped abrasion-resistant particles, is dispersed in a solvent together with preferably iron oxide particles and the binder which preferably consists of epoxide resin. The dispersion is deposited on the disk substrate by means of spinning-on, and subsequently cured. During curing, the reaction product (XV), i.e. the product depicted in FIG. 3, is formed out of the reaction product (XIV) and the epoxide resin in accordance with reaction (7).

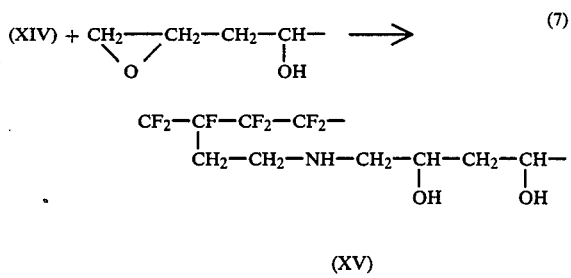  (7)

(XV)

The formula of the reaction product in accordance with reaction (7) merely represents that sector of (XV) which is relevant for the reaction.

The chemical composition between the abrasion-resistant particles and the PTFE can also be achieved without an initiator residue being inserted between the siloxane and the PTFE chain. For that purpose, the abrasion-resistant particles consisting of the hard oxide with OH groups at the particle surface are processed, as described above, with a siloxane as e.g. vinyl triethoxysilane, vinyl trimethoxysilane, propenyl triethoxysilane and propenyl trimethoxysilane in accordance with reaction (8).

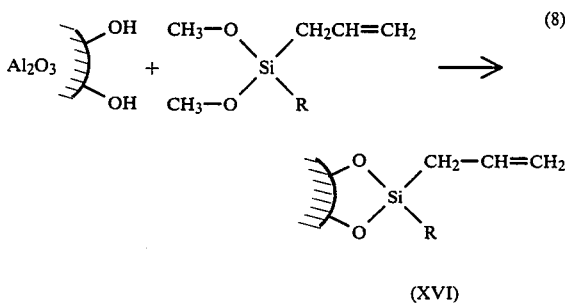  (8)

(XVI)

The result of the reaction is reaction product (XVI). The reaction product (XVI) copolymerize with tetrafluoroethylene in accordance with reaction (9), forming reaction product (XVII), with the reaction being initiated either photochemically or thermally.

(XVI) + INITIATOR + $CF_2=CF_2 \longrightarrow$  (9)

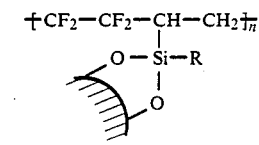

(XVII)

As initiators for thermal initiation, e.g. 2(tert.-butylazo)isobutyronitrile

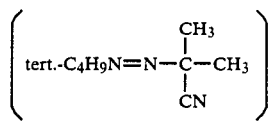

and for photochemical initiation benzophenone

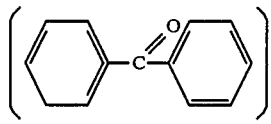

can be used.

The processing of the reaction product (XVII) is continued in the same manner as described above for the reaction product (XIII).

The last-mentioned method of making the bonding between the abrasion-resistant particles and the PTFE is preferably performed as follows:

700 g $Al_2O_3$ particles are suspended in 1400 ml distilled water, and stirred. 7 ml vinyl triethoxysilane are admixed dropwise to the suspension, and stirring is continued for approximately 30 minutes. This is followed by a filtering process with suction, three ethanol rinses, and drying at 30° C. in a high vacuum for three days, and finally by sieving. The siloxane-coated $Al_2O_3$ is dispersed in two liters of distilled water, and stirred, and admixed to the dispersion are 140 ml of a 10% solution of 2(tert.-butylazo)isobutyronitrile in propanol. The dispersion is heated for one minute to 90° C., and subsequently cooled to 0° C. in iced water. Then, tetrafluoroethylene is added until the necessary particle size has been reached. The changes of size are controlled microscopically and via the added weight wnich is to amount to approximately 50%.

Processing of the thus obtained reaction product (i.e. reaction product (XVII)), as well as of the reaction product (XIII) obtained following the Grignard process, is preferably continued as follows:

In a glow discharge reactor operating e.g. with a power of 100 Watt, a pressure of approximately 1.33 mbar and a high frequency of 13 Mcps, the PTFE-coated aluminum oxide particles are made to react with an amine. For that purpose, e.g. butylamine is directed into the glow discharge reactor containing the aluminum oxide particles which are agitated by means of ultrasound. The dosage of the butylamine is effected in such a manner that nitrogen as a carrier gas, with a flow quantity of 100 ml/min., is directed over boiling butylamine and subsequently into the glow discharge reactor. The butylamine is activated in the plasma generated in the reactor, and reacts in that state with the PTFE envelope of the aluminum oxide particles.

The product obtained in the glow discharge reactor is dispersed with $\gamma$-$Fe_2O_3$ in dissolved binder. The solid substance percentage in the dispersion is composed as follows: 1.5% by weight enveloped aluminum oxide particles, 49% $\gamma$-$Fe_2O_3$, 30% epoxy resin, 18% phenol resin, e.g. methylon resin, and 1.5% by weight additives. The solvent consists preferably of a mixture comprising xylene, ethylamylketone and isophoron. The quantity of the solvent is set in such a manner that an aluminum substrate plate can be coated with the dispersion in the necessary thickness. The weight ratio of solid substance percentage and solution percentage is 40:60. For dispersion, ball mills, agitators or pearl mills are preferably used. After the spinning-on of the dispersion onto the aluminum plate substrate there follows a curing by heating for approximately 2 hours to 235° C. Finally, the magnetic layer is polished and, if necessary after a cleaning step, coated with a lubricant film.

We claim:

1. A magnetic disk having a magnetic layer applied on a substrate and comprising a binder, magnetic particles, and particles of an abrasion-resistant material, characterized in that the abrasion-resistant particles are of diameter smaller than the thickness of the magnetic layer, and comprise hard ceramic material coated with an enveloping layer, and in that the enveloping layer comprises a material selected from the group consisting of $SiO_2/Al_2O_3$ and poly(tetrafluorethylene, and is between 1 and 100 nanometers thick, and further characterized in that the abrasion-resistant particles are coated prior to being dispersed in the binder and in that said coating and said enveloping layer intensify the bonding of said abrasion-resistant particles with the binder.

2. A magnetic disk as claimed in claim 1, characterized in that the abrasion-resistant particles comprise a hard oxide with OH groups on the particle surface, and a coupling agent having functional groups which react with the hydroxy groups of the hard oxide, and in that the enveloping layer comprises poly(tetrafluoroethylene).

3. A magnetic disk as claimed in claim 2, characterized in that a poly(tetrafluoethylene) envelope is chemically bonded with the abrasion-resistant particles via a siloxane bridge which is derived from a silane coupling agent and, to the binder via an amino ridge.

* * * * *